UNITED STATES PATENT OFFICE.

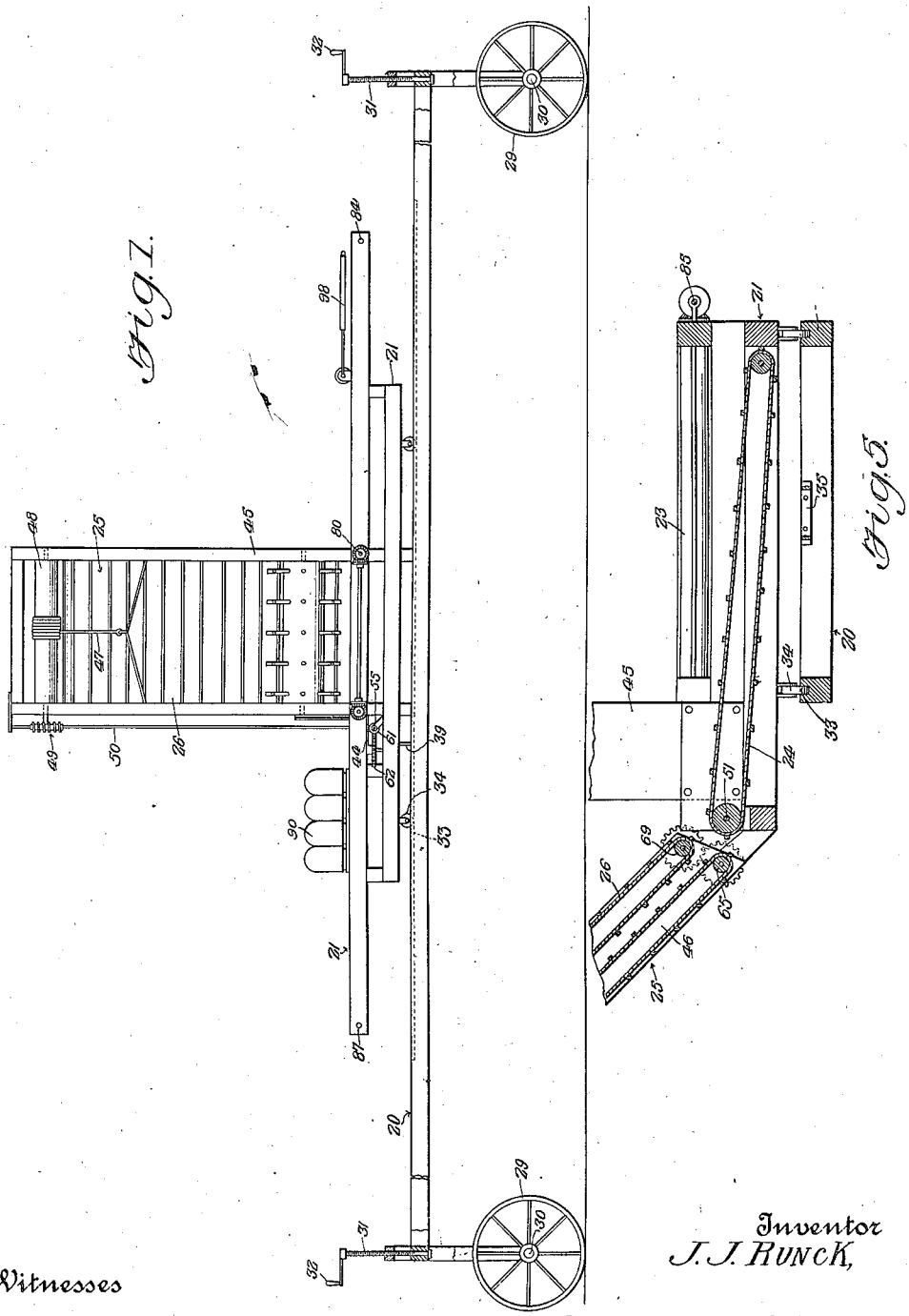

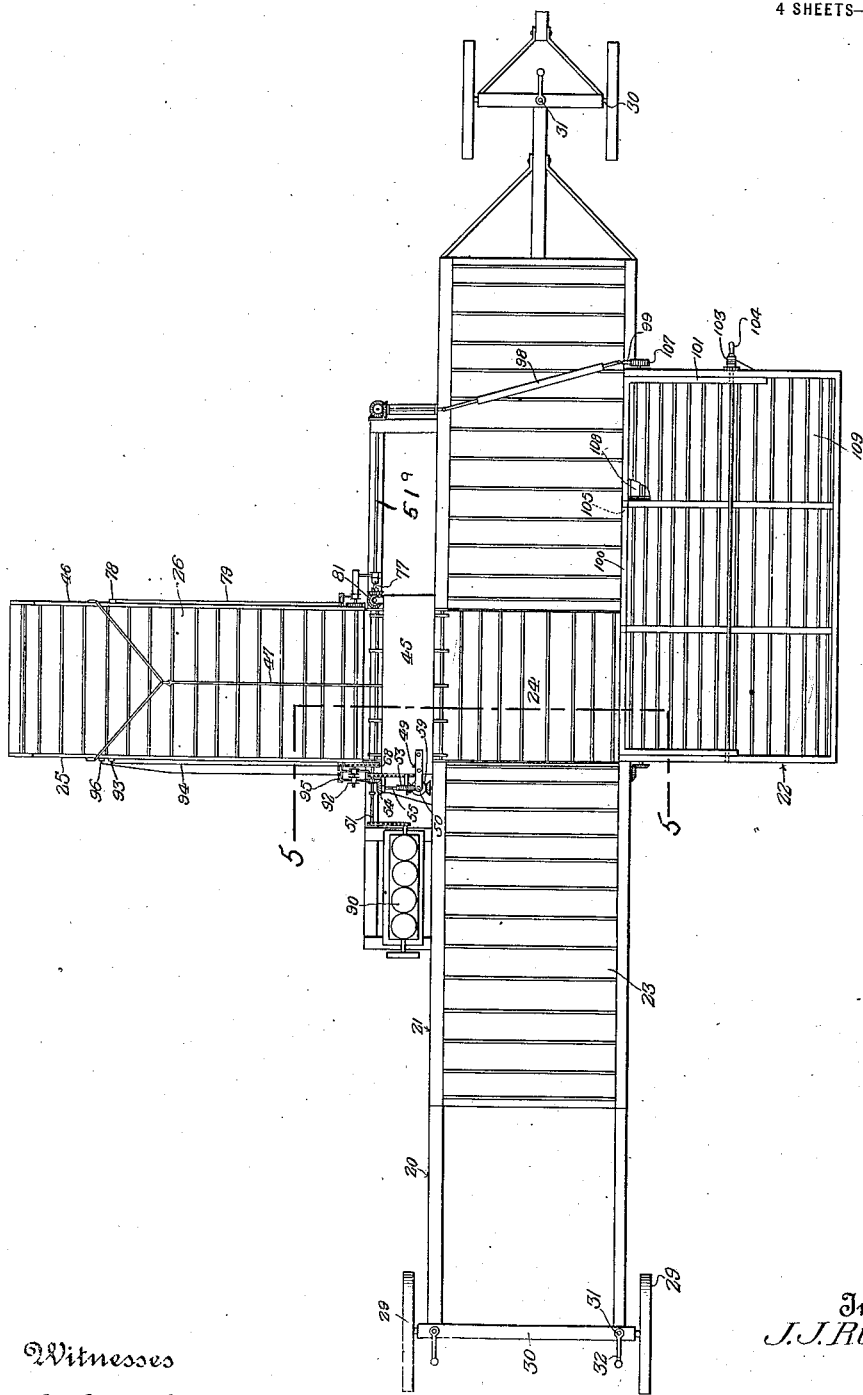

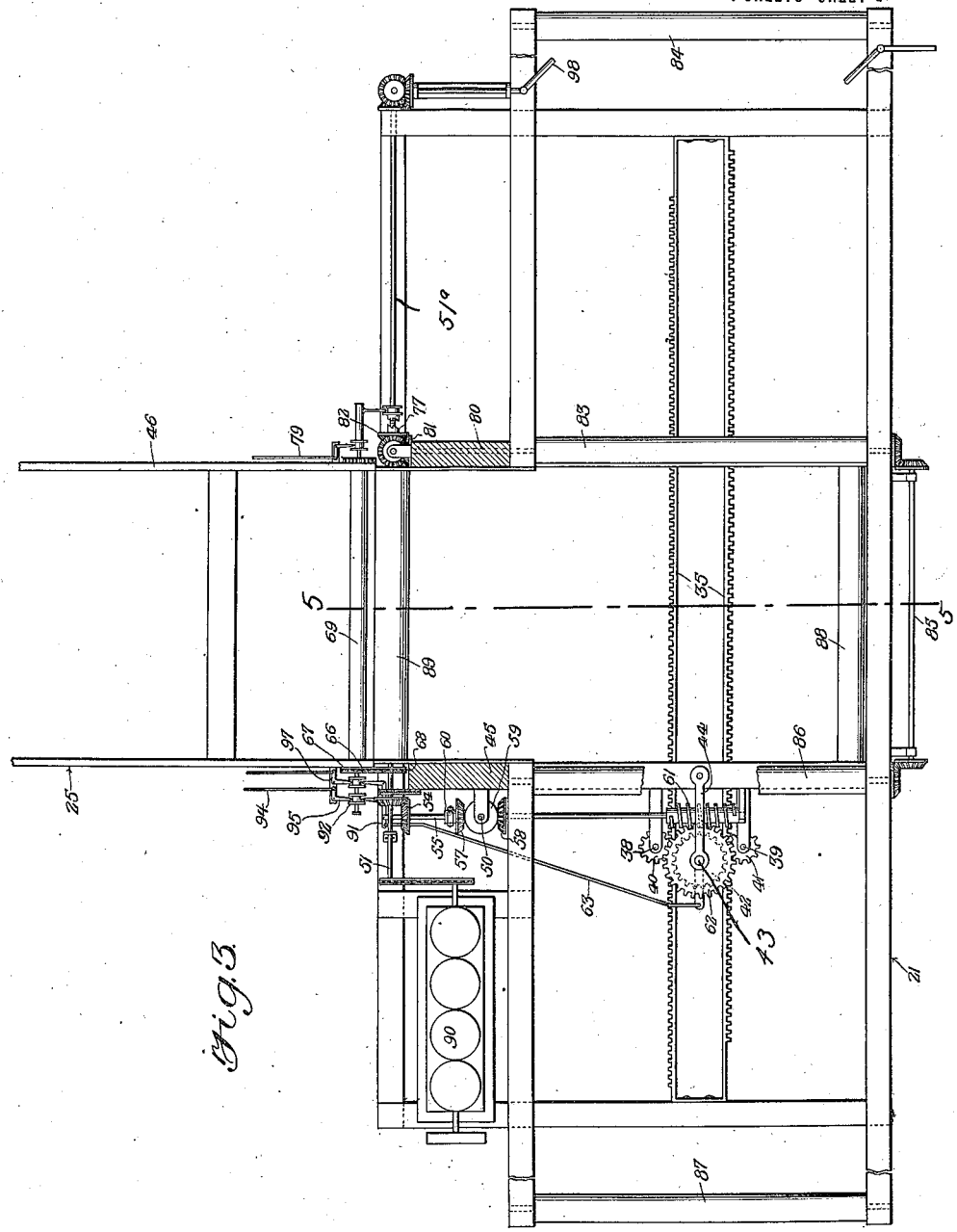

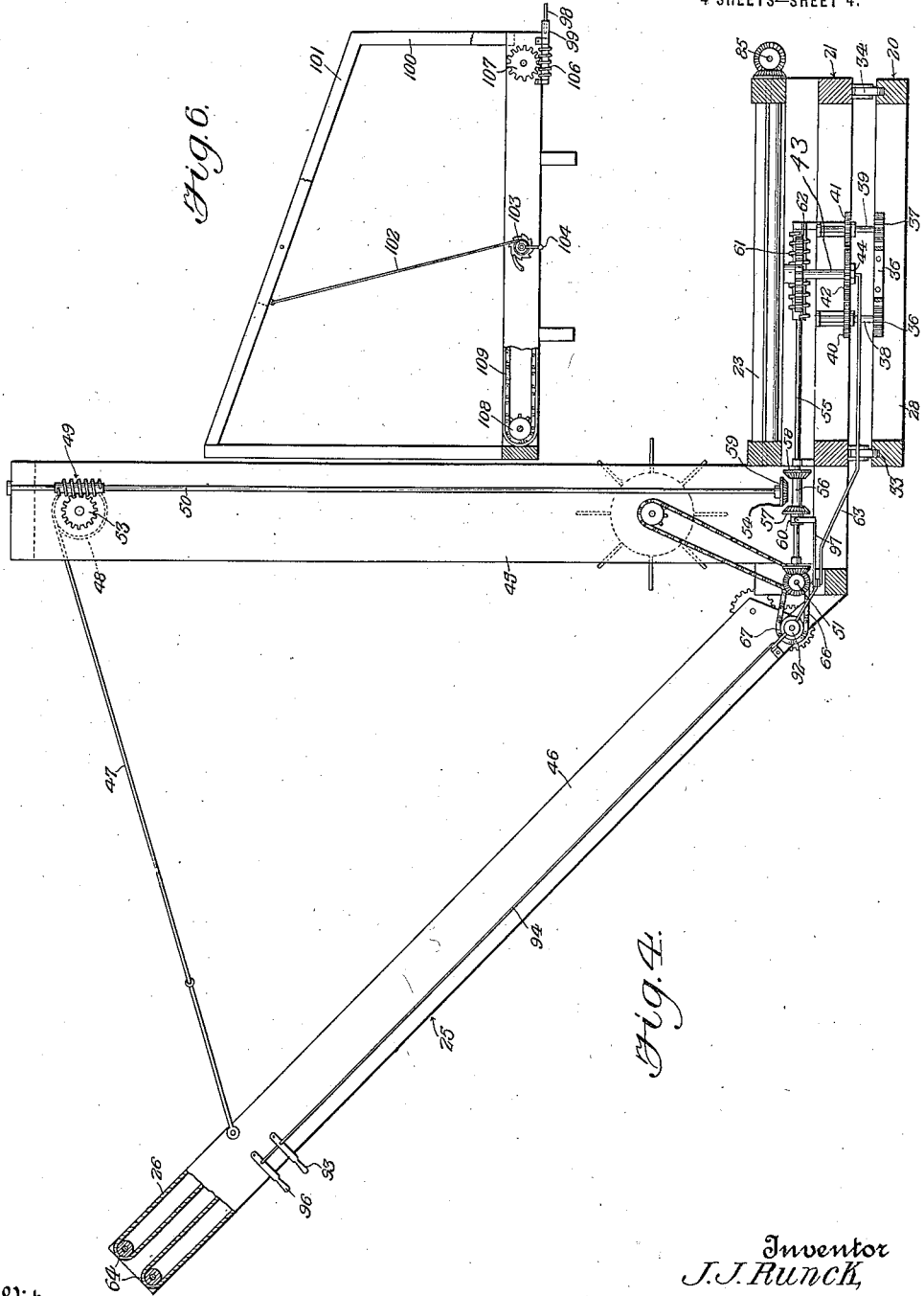

JOHN J. RUNCK, OF REPUBLICAN CITY, NEBRASKA.

UNLOADING AND ELEVATING APPARATUS.

1,388,063.  Specification of Letters Patent.  Patented Aug. 16, 1921.

Application filed December 6, 1918. Serial No. 265,550.

*To all whom it may concern:*

Be it known that I, JOHN J. RUNCK, a citizen of the United States, residing at Republican City, in the county of Harlan and State of Nebraska, have invented new and useful Improvements in Unloading and Elevating Apparatus, of which the following is a specification.

The object of the invention is to provide an unloader and elevator mechanism of a portable type suitable for receiving material from a hauling and delivering mechanism or vehicle and stacking the same, the device being capable of receiving material from a stationary delivery apparatus while pursuing a progressively distributing movement at the point of discharge, and the rapidity of delivery to the feed element being in timed relation to the capacity of the conveyer mechanism by which said material is elevated from the feed mechanism to the point of discharge.

Further objects and advantages of the invention will appear in the course of the following description of a preferred embodiment thereof, it being understood that changes in the form, proportion and details may be resorted to within the scope of the appended claims, without departing from the principles involved.

In the drawings:—

Figure 1 is a side view of the apparatus showing the delivery mechanism in operative relation therewith.

Fig. 2 is a plan view of the same.

Fig. 3 is a front view of the feed and elevator mechanism.

Fig. 4 is a rear view of the same.

Fig. 5 is a sectional view on the plane indicated by the line 5—5 of Figs. 2 and 3.

Fig. 6 is a detail view of the feed shift mechanism.

Essentially the apparatus comprises a base 20 which is preferably constructed in the form of a truck so as to be movable from place to place as may be required in the handling of material for stacking or placing it in storage, a carrier 21 mounted upon the base or truck and movable back and forth relative thereto and with reference to a delivery mechanism 22 consisting of what may for convenience be termed a hauling box or vehicle, a feed mechanism being duly supported by the carrier for the reception of material from the delivery mechanism and including oppositely movable longitudinal aprons 23 and an intermediate transverse apron 24, an elevator frame 25 which is angularly adjustable with reference to the plane of the carrier and is mounted thereon, said elevator having aprons 26 and 26$^a$ for the reception of material from the feed mechanism and adapted to discharge at its upper end upon a stack or into a loft or other selected receptacle and a transfer mechanism including a supplemental apron or belt for conveying the material from the transverse element of the feed mechanism to the apron of the elevator mechanism.

In the illustrated form of the device the base or truck in addition to a suitable frame work is provided with supporting wheels 29 carried by front and rear axles 30 vertically adjustable by means of hanger bolts 31 provided with suitable operating cranks 32. On the longitudinal side bars of said truck frame are arranged tracks 33 for traverse by wheels 34 on the carrier frame and also disposed longitudinally of said truck frame is a double rack 35 the elements of which are adapted for engagement respectively by feed pinions 36 and 37 of which the spindles 38 and 39 are mounted upon the carrier frame and are provided at their upper ends with gears 40 and 41 for alternate and selective engagement by a gear 42 of which the spindle 43 is carried by a pivotal or swinging yoke 44.

Rising from the carrier frame is an upright frame 45 near the base of which the elevator frame 25 is pivotally mounted and the angular adjustment of the elevator frame is secured by means of a cable 47 extending to a roller or drum 48 adapted to receive motion in one direction or the other according to whether the elevator is to be raised or lowered by means of the worm 49 on a counter-shaft 50 mounted upon the side of the upright frame and adapted to receive motion from a main or drive shaft 51. In order that the drum by which the elevator frame is adjusted may be retained in a locked position at any desired adjustment the gearing by which it receives motion from the shaft 50 preferably consists of the worm 49 meshing with a worm gear 53.

Operatively connected with the main or drive shaft 51 by means of intermeshing gears 54 is a feed shaft 55 upon which there is sleeved as at 56 a pair of oppositely disposed bevel gears 57 and 58 either of which may be engaged with a bevel gear 59 of the shaft 50, so as to impart motion in one direction or the other to the latter to adjust the elevator frame, a grooved collar 60 being arranged upon said sleeve 56 to provide for the shifting movement of the gears 57 and 58.

The feed shaft carries a worm 61 meshing with a worm gear 62 which is also secured to the spindle 43 of the gear 42 and while through this agency the worm gear and hence the spindle and the gear 42 receive continuous motion in one direction during the operation of the main or drive shaft, motion is communicated to one or the other of the gears 40 and 41, to cause opposite feeding movement of the carrier frame, by swinging the yoke 44 in one direction or the other as by means of a connecting rod 63 and other means hereinafter described in detail. It will be noted that the racks on the base or truck which are engaged by said feed pinions 36 and 37 terminate short of each other at opposite ends so as to leave open or untoothed spaces whereby when the carrier, which is being moved in one direction by a feed pinion reaches the limit of such movement, it will automatically become disengaged from the rack to permit the movement to cease.

The elevator apron 26 at the upper end of the frame traverses roller 64 and at its lower end a drum or roller 65 which is mounted concentric with the axis of pivotal movement of the elevator frame and receives motion from the main or drive shaft by means of a chain 66 traversing sprockets 67 and 68. The elevator apron 26ª at the upper end of the frame traverses roller 64ª and at its lower end a roller or drum 69 having a gear 70 meshing with a gear 71 mounted on the roller 64. Motion is communicated from the drive shaft 51 to a drum 72 carried by the frame 45 by means of a chain 73 traversing sprocket wheels 74 and 75. The drum 72 is provided with arms 76 to prevent high lumps of straw, hay or the like from entering the elevator.

The main or drive shaft is provided with an independent member 51ª adapted to be coupled thereto by means of a clutch 77 actuated by a hand lever 78 which is connected therewith by a rod 79, and actuated by said shaft member 76 through a suitable shaft 80 and gearing 81 and 82 is a drum or roller 83 for the inner end of one of the longitudinal feed aprons 23, said apron at the extremity of the carrier frame extending around a roller 84. From the roller 83 through a transverse shaft 85 motion is communicated to the inner drum 86 of the other longitudinal apron 23 which at its outer end passes around the roller 87. It will be noted that the transverse shaft is terminally geared with the outer or forward extremities of the drums 83 and 86 so that both of said longitudinal aprons move toward the center or intermediate portion of the carrier frame to deposit material upon the transverse apron or belt 24 which is carried by front and rear rollers 88 and 89, of which the latter receives motion by suitable gearing from the drive shaft 51.

Thus when the main or drive shaft is in operation, being driven by any suitable motor indicated at 90, and the shaft member 76 is clutched thereto, the several longitudinal and transverse aprons of the feed mechanism are operated in the proper direction to carry material deposited thereon toward the center of the carrier frame and thence rearwardly where it is taken up by the transfer apron and deposited upon the elevator apron to be discharged at the upper end of the latter.

As above described the shifting of the yoke 44 to cause the movement of the carrier in one direction or the other is secured through a connecting rod 63, which may as shown be connected with a bell crank lever 91 of which one arm is engaged with a collar 92 slidingly mounted upon the spindle of the lower or driving drum of the elevator apron said collar in turn being actuated by a lever 93 mounted upon the elevator frame and connected by a rod 94 with a bell crank 95 which is also engaged with said collar. Also mounted upon the frame of the elevator is a handle or lever 96 suitably connected with a shift lever 97 for movement of the sleeve 56 to secure the desired adjustment of the angular position of the elevator frame. All of these operating levers are preferably located near the upper end of the elevator frame so as to be within convenient reach of an operator positioned upon a stack which is being formed by the elevator mechanism.

Also connected with the shaft member 51ª by means of suitable intermediate gearing is a flexible shaft 98 provided with universal joints 98ª adapted for connection with a worm shaft 99 on the delivery mechanism 22, which preferably consists essentially of a compartmental receptacle having a closing rack 100 hingedly connected to one side adapted to be elevated to open the compartments and actuated through a cable 102 by a drum 103 to which is attached a suitable crank 104, a suitable pawl and ratchet mechanism as illustrated being employed to hold the rack in its adjusted position and the uprights of said rack being adapted when depressed for engagement with sockets 105 in the floor of the apparatus. Arranged upon the worm shaft 99 is a worm 106 meshing with a worm gear 107 secured to the end of a drum 108 which is traversed by an endless apron 109 forming the floor of the receptacle compartment in which it is located, so that material contained in said compartment may be fed continuously and regularly to the open discharge side of the receptacle where it falls upon the feed aprons of the elevator mechanism to be conveyed to the elevator apron as hereinabove described.

From the foregoing description it will be seen that the apparatus by reason of the movability of the elevator element may be operated to properly distribute material upon the stack or place of deposit. The feed mechanism which brings the material to the foot of the elevator by reason of the inwardly movable longitudinal aprons and the transverse intermediate receiving apron leading to the foot of the elevator is adapted to receive this material from the delivery or hauling apparatus in all positions of the elevator while the rapidity of movement of the material from said delivery or hauling apparatus to the feed mechanism is timed to agree with the operation of the feed mechanism and the entire apparatus is under the immediate control of a single operator who may stand at the discharge end of the elevator and throw the elevator and feed mechanism into and out of operation and also cause the required backward and forward movement of the carrier as the conditions of service may require. Obviously, moreover, the movement of the carrier in one direction or the other may be checked at will by throwing the operating gearing into a neutral position.

Having described the invention I claim:—

1. An apparatus of the class described comprising a truck provided with longitudinal side bars having tracks arranged thereon, a carrier mounted upon said tracks and movable back and forth relative thereto, an elevator supported by the carrier and provided with endless conveyers, feed mechanism on the carrier leading to the foot of the elevator, delivery mechanism for discharging material upon said feed mechanism, a motor supported by the carrier, and operating connections between said motor, and the elevator conveyer, the carrier feed mechanism and the delivery mechanism.

2. An apparatus of the class described, comprising a truck provided with longitudinal side bars having tracks arranged thereon, a double rack disposed on said frame between said tracks, a carrier mounted upon said tracks, an elevator supported by the carrier and provided with endless conveyers, feed mechanism on the carrier leading to the foot of the elevator, delivery mechanism for discharging material upon said feed mechanism, a motor supported by the carrier, means carried by said carrier adapted to be actuated by said motor to move said carrier and elements supported thereby longitudinally upon said tracks to vary the position of discharge.

3. An apparatus of the class described comprising a truck provided with longitudinal side bars having tracks arranged thereon, a carrier mounted upon said tracks, positioning means for the carrier, an elevator supported by the carrier and provided with endless conveyers, feed mechanism on the carrier leading to the foot of the elevator and adapted to receive material therefrom, a motor supported by the carrier, a delivery mechanism and means carried by said carrier adapted to be actuated by said motor to move said feed mechanism toward the foot of the elevator.

4. An apparatus of the class described comprising a truck provided with longitudinal side bars having tracks arranged thereon, a carrier mounted on said tracks, an elevator supported by the carrier and having a conveyer mechanism, a feed mechanism mounted upon the carrier and leading to the foot of the elevator, a transfer mechanism for conveying material from the feed mechanism to the elevator conveyer, delivery mechanism for discharging material upon said feed mechanism and having means for advancing such material to the point of discharge, said delivery mechanism being independently movable relative to the truck, a motor supported by the carrier and operating mechanism between the motor and the elevator conveyer, the positioning devices for the carrier, the feed mechanism of the carrier, the transfer mechanism and the delivery mechanism, and including coupling devices for the material advancing means of said delivery mechanism.

5. A device of the class described comprising a truck provided with longitudinal side bars having tracks arranged thereon, a carrier mounted on said tracks and movable back and forth relative thereto, an elevator supported by the carrier, a feed mechanism mounted upon the carrier for directing the material to said elevator, a delivery mechanism, and means for actuating said delivery mechanism and directing the material to the feed mechanism aforesaid.

6. A device of the class described comprising a truck provided with longitudinal side bars having tracks arranged thereon, a carrier mounted on said tracks and movable back and forth relative thereto, a feed mechanism mounted thereon leading to the foot of the elevator, a delivery mechanism for discharging material upon said feed mechanism, a motor supported by the frame, an elevator supported by the carrier and provided with endless conveyers, means carried by said frame for imparting motion to said conveyers, and means for raising and lowering said elevator.

7. An apparatus of the class described having a carrier and a base for supporting the same, means for shifting the carrier upon the base, an elevator having its frame pivotally mounted upon said carrier, an upright frame also supported by the carrier, feed mechanism supported by the carrier and leading to the foot of the elevator, a drive shaft and operating connections between the shaft and said elevator and feed mechanism, transfer mechanism between said drive shaft and delivery means for feeding the material to the carrier mounted on said base, means for varying the angular position of the elevator frame including a drum mounted on said upright frame and a cable extending to the elevator frame, and a clutch controlled feed mechanism connecting the drive shaft with the drum.

8. An apparatus of the class described having a carrier and a base for supporting the same, means for shifting the carrier upon the base, an elevator having its frame pivotally mounted upon said carrier, an upright frame also supported by the carrier, feed mechanism supported by the carrier and leading to the foot of the elevator, a drive shaft and operating connections between the shaft and said elevator and feed mechanism, transfer and delivery means for feeding the material to the carrier mounted on said base, means for varying the angular position of the elevator frame, including a drum mounted on said upright frame and a cable extending to the elevator frame, and a clutch controlled feed mechanism connecting the drive shaft with the drum, including a worm and gear connection for maintaining said drum in its adjusted positions.

9. A device of the class described comprising a truck provided with longitudinal side bars having tracks arranged thereon, a carrier mounted upon said tracks, an upright frame supported by said carrier, positioning means for the carrier, an elevator supported by the carrier and provided with an endless conveyer, a transfer mechanism on the carrier for directing the material to the elevator, means carried by said upright frame for loosening material carried by the transfer mechanism, feed mechanism on the carrier for directing the material to said transfer mechanism, delivery mechanism on the carrier for directing the material to said feed mechanism, and means mounted on the carrier for actuating said delivery, feeding, transfer and elevator mechanism aforesaid.

In testimony whereof I affix my signature.

JOHN J. RUNCK.